March 20, 1945.  A. C. LANE  2,371,962

DYNAMO-ELECTRIC MACHINE

Filed Dec. 22, 1943

Inventor:
Arthur C. Lane,
by Harry E. Dunham
His Attorney.

Patented Mar. 20, 1945

2,371,962

UNITED STATES PATENT OFFICE 2,371,962

DYNAMOELECTRIC MACHINE

Arthur C. Lane, Rugby, England, assignor to General Electric Company, a corporation of New York Application December 22, 1943, Serial No. 515,227
In Great Britain January 15, 1943

5 Claims. (Cl. 172—276)

This invention relates to dynamoelectric machines and more particularly to alternating current commutator machines where the possible output is limited either by the transformer voltage induced between commutator segments or by the reactance voltage of commutation or by a combination of both.

The object of this invention is to produce a true quadruplex winding, the four elements of which are so arranged that there are no unbalanced voltages between them and, consequently, no circulating currents flowing in and around them when they are interconnected, such as by brushes or interconnectors. For the same polar flux, a quadruplex winding produces only one half of the transformer voltage per segment produced by a duplex winding, or one quarter of that produced by a simplex winding, assuming all to be of the same winding pitch. It therefore follows that the use of a quadruplex winding enables the use of a full pitched commutator winding in association with a much greater value of field flux than hitherto and the scope of usefulness of such machines is correspondingly greatly increased to cover a higher range of output. There are other advantages in the use of a quadruplex winding which are obvious to those familiar to the art of machine design, such for example as the advantageous effect of multiple circuits upon the reactance voltage of commutation.

This invention consists in dividing the magnetic rotor core of the commutator member into two halves by a central duct to permit of the commutator winding being executed in accordance with a definite ruling.

The invention will be better understood by reference to the accompanying diagrams.

Figure 1:
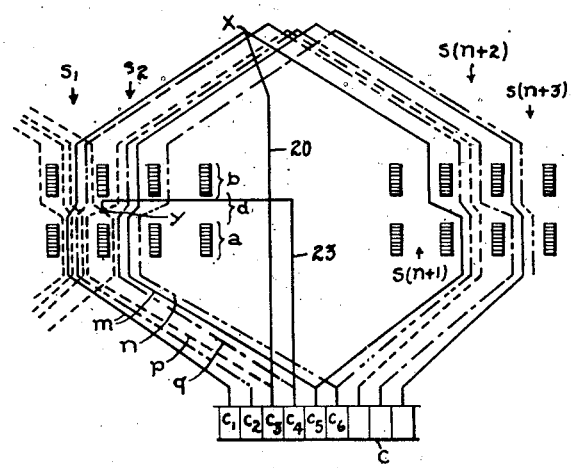
Figure 2:
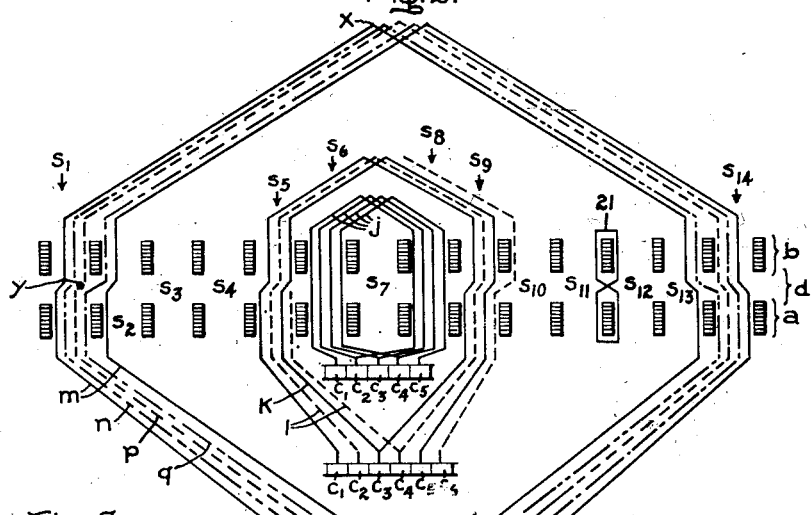
Figure 3:
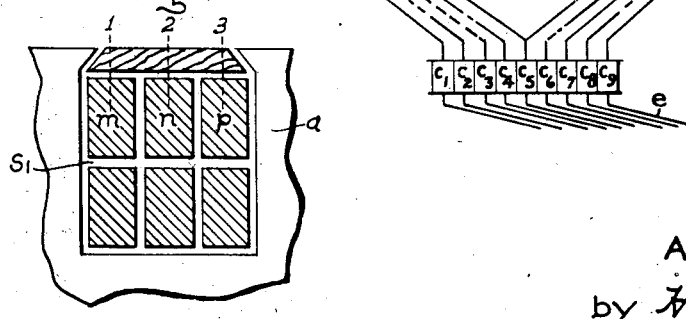

Fig. 1 represents the slot arrangement of the conductors of a quadruplex winding arranged according to my invention. Fig. 2 illustrates the invention with the addition of duplex and simplex coupling windings, and Fig. 3 represents a cross section through slot $S_1$ in stator section $a$ of Fig. 1.

Referring first to Figure 1, which represents diagrammatically a part of the commutator machine winding, in which $a$ represents one half and $b$ the other half of the magnetic core, the duct between them being shown at $d$. $c_1$ to $c_5$ represent 5 adjacent commutator segments and $m, n, p$ and $q$ represent the 4 circuits of the quadruplex winding connected to segments $c_1, c_2, c_3, c_4$ respectively. $S_1, S_2$—$S(n+1)$, $S(n+2)$ etc., represent slots in the core where $n$=a number of slots per pole. The figures 1, 2, 3 in the slots (see Fig. 3) indicate the conductor-positions, there being three conductors per slot per layer in this chosen example. 1 is called the first conductor-position, 2 the second conductor-position, and so on. The fourth conductor-position, for example, of any slot would therefore mean the first conductor-position of the next slot in the direction of winding, since there are only three conductor-positions per slot per layer in this instance. The conductors shown in the bottom layer in Fig. 3 are the conductors of the right-hand edge of coils lying to the left.

In order to carry out this invention, it is necessary that the quadruplex winding be executed in the following manner:

Arbitrarily chosen circuit number one shall commence at arbitrarily chosen commutator segment number one, shall lead to the 1st conductor-position in slot number one in the $a$ core; thence across the central duct to the 2nd conductor-position in slot number one in the $b$ core; thence outside of the core to the 3rd conductor-position in slot number $(n+1)$ in the $b$ core; thence back across the central duct to the 4th conductor-position in slot number $(n+1)$ in the $a$ core; thence to commutator segment number 5.

Circuit number 2 shall now commence at commutator segment number 2 and shall be one conductor-position in advance of circuit number one in the direction of winding in all slot portions, continuing to commutator segment number 6. Each of the other two circuits and the remainder of the winding is wound similarly and will be seen to follow automatically from the definition of the first turn of circuit number one given above.

In applying this rule to the example illustrated in Fig. 1, it can be seen that the 1st circuit marked $m$ holds 1st conductor-position in slot $S_1a$, the 2nd position in slot $S_1b$, the third position in slot $S(n+1)b$ and the 4th position in slot $S(n+1)a$, which is actually the 1st conductor-position in slot $S(n+2)a$ in accordance with the definition of "conductor position" given above.

Voltage equalizing means may thereafter be employed to couple the four circuits and mention will be made of some of the possible ways in which this may be done, any one alone or in combination with any other or others being omitted.

If the winding sections shown heavy in slot $S_1$ be considered the trailing sides of coils, it will of course be apparent that other winding sections comprising the leading sides of different coils of the quadruplex winding will be contained in the same slots, either above or below the conductors shown, and staggered in the slots as are the conductors of the leading coil sides shown in slot S(n+2). Such other winding sections are indicated by dotted lines in slot S1. It is seen that in the transfer space between the aligned tooth core sections at the center of the core and at all teeth, opposite sides of different coils are transferred from a slot in one end of the core to a staggered slot in the opposite end of the core.

It will be noted that the splitting of the magnetic rotor core into two axially spaced parts permits of winding coils which may be termed fractional tooth pitch coils. Thus, the coil between the commutator sections $c2$ and $c6$ is a full tooth pitch coil, one side being completely in slot S1 and the other side being completely in slot S(n+2), whereas the coil between segments $c1$ and $c5$ is a fractional tooth pitch coil, since it has, in effect, one-half tooth pitch less than the coil just previously considered. This is obtained by reason of the transfer from slot S(n+1) to slot S(n+2) in the center of the core. In the quadruplex winding shown half of the coils are of each type, and it is further noted that they are so disposed that one end of a coil of each pitch is connected to each commutator segment. Thus, segment $c5$ is connected on the right to a fractional tooth pitch coil and on the left to a full tooth pitch coil. Thus, each section of the quadruplex winding comprises alternate full tooth pitch and fractional tooth pitch coils connected in series.

Equipotential connectors may join any segment to any point in any circuit which is at the same potential, such conductors to lie wholly outside of the magnetic circuit. For example, point $x$ in Fig. 1 being the mid-point of the turn joining segments $c1$ to $c5$ and which is in the first circuit may be connected in this manner as by a conductor 20 to segment $c3$ which is in the 3rd circuit. Or the point $y$ in the central duct belonging to the 3rd circuit may be similarly joined as by a conductor 23 to segment $c4$ which is in the 4th circuit. Any proportion of the total possible connectors may be used.

Or, a voltage equalizing duplex winding may be connected in parallel with the main quadruplex winding, thus automatically coupling alternate circuits completely, besides having other beneficial operational advantages. Such a duplex winding to be effective must necessarily be executed in the following or equivalent manner:

Of the two circuits, the first shall start at the same commutator segment number one of the quadruplex winding, shall lead to the 1st conductor-position in slot number $$\left(\frac{n}{3}+1\right)$$

in the $a$ core; thence across the duct to the 2nd conductor-position in slot number $$\left(\frac{n}{3}+1\right)$$

in the $b$ core; thence outside of the core to the 2nd conductor-position in slot number $$\left(\frac{2n}{3}+1\right)$$

in the $b$ core; thence back across the duct to the 1st conductor-position in slot number $$\left(\frac{2n}{3}+1\right)$$

in the $a$ core; thence to commutator segment number 3.

This definition of the 1st turn of the 1st circuit of the duplex winding automatically indicates the procedure with the other circuit and the remainder of the winding.

The word "equivalent" is used at the beginning of this definition of duplex construction since it is possible to interchange the conductor-positions of the circuits in the $a$ and $b$ cores, so that the order of conductor-positions given as 1st, 2nd, 2nd, 1st may equally be 1st, 2nd; 1st, 2nd, or again otherwise. Convenience of winding may determine the exact procedure.

The circuits of this duplex winding may themselves be coupled by a simplex winding in parallel with it, which simplex winding is defined in the next alternative method of coupling.

It is noteworthy that this duplex winding may not have its two circuits coupled by single equalizers, since the potentials of its evolutes have no correspondence with any points on the commutator.

Reference to Fig. 2 illustrates the duplex coupling, and the numbers and letters of the figure correspond to those of Fig. 1. The two circuits of the duplex winding are indicated at $k$ and $l$. Or, a simplex winding may be connected in parallel with the quadruplex winding, thus automatically coupling all four circuits. Such a simplex winding to be effective must necessarily be executed in the following manner:

The winding shall start at the same segment number one of the quadruplex winding, shall lead to the 1st conductor position in slot number $$\left(\frac{5n}{12}+1\right)$$

in both $a$ and $b$ cores; thence outside of the core to the 1st conductor-position in slot number $$\left(\frac{7n}{12}+1\right)$$

in both the $b$ and $a$ cores; thence to segment number 2. The rest of the winding follows automatically. Such a simplex winding is illustrated in Fig. 2 and is indicated at $j$. In this figure, the commutator is shown three times, for the sake of clarity.

Where a simplex winding coupling means is employed, there is introduced a small unbalance of voltage. By a correct choice of slot number, namely, slots per pole $n=12x$, where $x$ is integral, this unbalance is completely inadequate to detract from the correct and efficient functioning of the quadruplex winding, provided that the simplex winding is carried out in the manner described above.

Thus, Fig. 2 represents the scheme for a completely equalized and coupled winding for the case of $n=12$ slots per pole and with 4 segments per slot; $e$ conventionally representing equalizers.

Reference to the term "commutator segments" in the above is intended to convey either commutator segments in actuality, or the equivalent of commutator segments, for it is well known in the execution of the art of electrical machine winding design that windings may be connected to the actual commutator segments either directly or through the intermediary of connections; such connections being either inside of or outside of the magnetic core, that is, either active or inactive connections which may be of copper or the like or of "resistance material." The actual commutator position may therefore be on one side or on the other side, or on both sides of the winding.

The relative sections of, or the material of, or the relative positions in the depth of the slot of the various paralleled windings or connectors may be chosen to suit the particular function each, or any, is desired to fulfill, and it is not necessary to stress any limitations in these directions.

Means may be used to ensure an equality of magnetic flux in the two halves of the core. The "figure 8" loop, as shown at 21 in Fig. 2, around the two halves of any tooth is one such means.

While both a duplex and a simplex winding as illustrated in Fig. 2 could be used with the quadruplex winding, this is generally unnecessary, and, in practice, preferably only one of these fractional pitch windings would be used. In either case equalizer connections may be used with the quadruplex winding. The use of equalizer connections is more important where only the duplex winding is used in the combination because in this case, the duplex winding furnishes a voltage equalizer tie only between alternate segments and not between adjacent segments of the commutator. The combination of a quadruplex winding and a simplex winding is particularly beneficial in stator fed alternating current commutator motors where the induced rotor voltage is proportional to the slip.

What I claim as new and desire to secure by Letters Patent of the United States is:

1. In an alternating current commutator motor, a rotor having a slotted magnetic core the magnetic core being divided into axially spaced halves so as to allow for the winding of fractional slot pitched coils, a commutator having segments, a quadruplex winding connected to said commutator and contained in said slots, half of the coils of said winding being substantially full pitch coils and the other half differing from such pitch by one-half of a slot and the coils being so disposed that one coil of each pitch is connected to each commutator segment, and voltage equalizing means including another winding of fractional pitch for connecting said quadruplex windings together through the commutator.

2. In an alternating current commutator machine, a rotor having a slotted magnetic core made in equal axially spaced sections so as to permit of the transfer of certain winding conductors from one slot to a different slot within such core, a commutator, a quadruplex winding connected to said commutator and contained within the slots of said core, one coil per slot per coil side in one core section being similarly transposed between the core sections from such core section slot to an adjacent slot in the other core section and the other coil sides going through aligned slots in the core sections, and voltage equalizing means connecting said windings together through the commutator.

3. A rotor armature for alternating current dynamoelectric machines comprising a magnetic core divided into two axially spaced halves, said core being slotted with the slots aligned in the two halves, a commutator at one end of said rotor, a quadruplex winding connected to said commutator and contained in said slots, each winding section comprising alternate full tooth pitch and fractional tooth pitch coils connected in series, such fractional tooth pitch being obtained by running one side of the fractional tooth pitch coils through adjacently staggered slots in the two ends of said core, and a simplex winding on said core and connected to said commutator of a coil pitch such that both of said windings produce substantially equal voltages between those commutator segments across which they are connected in parallel.

4. A rotor armature for an alternating current dynamoelectric machine comprising a slotted magnetic core divided axially into two spaced halves and with aligned slots in the two halves, a commutator having segments, a quadruplex winding connected to said commutator and wound in said slots, the four sections of said winding each comprising alternate full tooth pitch and fractional tooth pitch coils connected in series, the fractional tooth pitch being obtained by running one side of the fractional tooth pitch coils through adjacently staggered slots in the two ends of said core, a duplex winding also connected to said commutator and wound in said slots and having a pitch such as to produce substantially the same voltage across the commutator segments to which connected as is produced across such segments by the quadruplex winding, and voltage equalizer connections completing the interconnections of said windings.

5. A rotor armature for an alternating current dynamoelectric machine comprising a slotted magnetic core divided axially into two halves with a conductor transfer space between them, and with the slots in the two halves in alignment, a commutator having segments, a quadruplex winding connected to said commutator and wound in said slots and including full pitch coils and coils having a fractional tooth pitch obtained by running coil sides through staggered slots in the two ends of the core and the transfer space, and equalizer conductors connected between such coils at such points of transfer and segments of equal potential on the commutator.

ARTHUR C. LANE.